(12) United States Patent
Stoller et al.

(10) Patent No.: US 12,474,499 B2
(45) Date of Patent: Nov. 18, 2025

(54) OUT OF RANGE GAMMA RAY ELEMENTAL YIELD SUPPRESSION

(71) Applicant: SCHLUMBERGER TECHNOLOGY CORPORATION, Sugar Land, TX (US)

(72) Inventors: Christian Stoller, Clamart (FR); Francoise Allioli, Clamart (FR); Fabien Haranger, Sugar Land, TX (US)

(73) Assignee: SCHLUMBERGER TECHNOLOGY CORPORATION SUGAR, Sugar Land, TX (US)

( * ) Notice: Subject to any disclaimer, the term of this patent is extended or adjusted under 35 U.S.C. 154(b) by 0 days.

(21) Appl. No.: 19/111,324

(22) PCT Filed: Oct. 4, 2023

(86) PCT No.: PCT/US2023/034418
§ 371 (c)(1),
(2) Date: Mar. 13, 2025

(87) PCT Pub. No.: WO2024/076602
PCT Pub. Date: Apr. 11, 2024

(65) Prior Publication Data
US 2025/0258314 A1 Aug. 14, 2025

(30) Foreign Application Priority Data
Oct. 4, 2022 (EP) .................................... 22306471

(51) Int. Cl.
*G01V 5/10* (2006.01)
(52) U.S. Cl.
CPC .................................. *G01V 5/101* (2013.01)

(58) Field of Classification Search
CPC ....................................................... G01V 5/101
See application file for complete search history.

(56) References Cited

U.S. PATENT DOCUMENTS

| 3,521,064 A | 7/1970 | Morgan et al. |
| 4,471,435 A | 9/1984 | Meisner |

(Continued)

FOREIGN PATENT DOCUMENTS

| WO | 2024076848 A2 | 4/2024 |
| WO | 2024076861 A2 | 4/2024 |

OTHER PUBLICATIONS

International Search Report and Written Opinion of International Patent Application No. PCT/US2023/034418 dated on Mar. 5, 2024, 09 pages.

(Continued)

*Primary Examiner* — Ricky Go
(74) *Attorney, Agent, or Firm* — Jeffrey D. Frantz

(57) ABSTRACT

A method for correcting elemental yields obtained from gamma ray spectra includes acquiring a plurality of elemental yields corresponding to a plurality of time intervals; summing one of the plurality of elemental yields with an accumulated negative yield to compute a corrected yield; setting the accumulated negative yield to a minimum of zero and the computed corrected yield; resetting the corrected yield to a maximum of zero and the computed corrected yield; and repeating the summing, the setting, and the resetting, for each of the acquired plurality of elemental yields to compute a corresponding plurality of corrected elemental yields.

20 Claims, 5 Drawing Sheets

(56) References Cited

U.S. PATENT DOCUMENTS

| | | |
|---|---|---|
| 4,712,424 A | 12/1987 | Herron |
| 5,360,975 A | 11/1994 | Stoller |
| 5,369,578 A | 11/1994 | Roscoe |
| 5,374,823 A | 12/1994 | Odom |
| 6,150,655 A | 11/2000 | Odom |
| 6,376,838 B1 | 4/2002 | Odom |
| 7,205,535 B2 | 4/2007 | Madigan et al. |
| 8,311,744 B2 | 11/2012 | Khisamutdinov et al. |
| 8,868,346 B2 | 10/2014 | Evans |
| 9,746,582 B1* | 8/2017 | Zhou .................... G01V 5/102 |
| 10,162,079 B2 | 12/2018 | Tkabladze |
| 10,209,378 B2 | 2/2019 | Galford |
| 2008/0023629 A1* | 1/2008 | Herron ................. G01V 5/125 702/6 |
| 2010/0302034 A1 | 12/2010 | Clements |
| 2010/0312479 A1* | 12/2010 | Khisamutdinov ...... E21B 49/00 250/262 |
| 2012/0197529 A1 | 8/2012 | Stephenson |
| 2013/0124094 A1* | 5/2013 | Galford ................. G01V 5/101 702/8 |
| 2013/0211724 A1 | 8/2013 | Fitzgerald |
| 2014/0114576 A1* | 4/2014 | Jain ....................... G01V 11/00 702/9 |
| 2015/0285943 A1* | 10/2015 | Stoller .................. G01N 33/24 702/8 |
| 2016/0003969 A1 | 1/2016 | Zhou |
| 2016/0195636 A1 | 7/2016 | Grau et al. |
| 2016/0370494 A1 | 12/2016 | Zhou |
| 2017/0146684 A1 | 5/2017 | Tkabladze |
| 2018/0059283 A1 | 3/2018 | Xu et al. |
| 2018/0113233 A1* | 4/2018 | Vinokurov .............. G01V 5/06 |
| 2019/0219732 A1* | 7/2019 | Galford ................. G01V 5/045 |
| 2020/0191992 A1 | 6/2020 | Inanc |
| 2020/0271800 A1* | 8/2020 | Galford ................. G01T 7/005 |
| 2021/0003737 A1 | 1/2021 | Whetton |
| 2021/0231828 A1* | 7/2021 | Pemper ................. G01V 5/108 |
| 2021/0355822 A1* | 11/2021 | Wu ........................ G01V 5/101 |
| 2022/0291415 A1 | 9/2022 | Inanc |

OTHER PUBLICATIONS

Evans, M, et al., "A Sourceless Alternative to Conventional LWD Nuclear Logging", SPE 62982, presented at the 2000 SPE Annual Technical Conferene and Exhibition, Dallas, Texas, USA, 8 pages.

Evans, M. et al., "Sourceless Neutron-Gamma Density (SNGD): A Radioisotope-Free Bulk Density Measurement: Physics Principles, Environmental Effects, and Applications", SPE-159334-PP, presented at the 2012 SPE Annual Technical Conference and Exhibition, San Antonio, Texas, USA, 18 pages.

International Search Report and Written Opinion of International Patent Application No. PCT/US2023/075318 dated on Mar. 21, 2024, 12 pages.

International Search Report and Written Opinion issued in the PCT Application No. PCT/US2023/075037 dated Mar. 21, 2024, 16 pages.

* cited by examiner

OUT OF RANGE GAMMA RAY ELEMENTAL YIELD SUPPRESSION

CROSS REFERENCE TO RELATED APPLICATIONS

This application is a National Stage Entry of International Patent Application No. PCT/US2023/034418, filed Oct. 4, 2023, which claims the benefit of E.P. patent application Ser. No. 22/306,471.8, entitled "OUT OF RANGE GAMMA RAY ELEMENTAL YIELD SUPPRESSION," filed Oct. 4, 2022, the disclosure of which is hereby incorporated herein by reference.

BACKGROUND

Natural and induced gamma ray spectroscopy measurements have been used in the oilfield industry for many decades to evaluate the elemental composition of subterranean formations. Natural gamma ray spectroscopy measurements are commonly used to estimate the relative amounts of potassium, thorium, and uranium in the formation. Induced gamma ray spectroscopy measurements may be used to estimate elemental concentrations of the formation from characteristic energy levels of gamma rays emitted by nuclei that have been activated by neutron bombardment (e.g., via a pulsed neutron generator).

Gamma ray spectroscopy measurements are commonly fit by decomposing a measured spectrum into spectral contributions from different elements. The decomposition is often accomplished by fitting a sum of standard gamma ray spectra to the measured spectrum by using a weighted least squares fitting procedure. The contribution of each of the standard spectra to the total spectrum is called a yield and generally varies from 0 to 1.

It will be appreciated that when an element is not present (or is at low concentrations) in a formation and does not contribute to the total (or measured) spectrum, its yield should equal zero. However, measured gamma ray spectra are statistical (e.g., based on counts of individual received gamma rays) such that the yields obtained from a fitting procedure can fluctuate statistically around the "true" value (and in the case of elements absent from the spectrum around zero). These fluctuations introduce negative yields that imply an unphysical negative concentration of a particular element.

In some applications negative yields are simply set to zero (based on the recognition that a negative elemental concentration is a physical impossibility). However, this common approach can be problematic in that it results in a positive average yield when averaged over an interval with a zero average yield. This may imply the presence of an element that is not present in the formation. Another approach taken to avoid negative yields is to use a fitting procedure that penalizes yields which are close to zero and may limit the results to zero or positive values. This approach has a similar drawback in that it results in a positive bias of the zero yield elements. There is a need in the industry for a method to eliminate the aforementioned negative yields without causing a corresponding positive yield bias.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Embodiments of this disclosure include systems and methods for correcting elemental yields obtained from gamma ray spectra. One example method includes acquiring a plurality of elemental yields corresponding to a plurality of time intervals. One of the yields is summed with an accumulated negative yield to compute a corrected yield. The accumulated negative yield is set to a minimum of zero and the computed corrected yield. The corrected yield is reset to a maximum of zero and the computed corrected yield. The reset corrected yield may be output. The process may be repeated for each of the acquired elemental yields to compute a corresponding plurality of corrected elemental yields. The method may advantageously improve the identification of zero yield regions in an elemental yield log and may further eliminate (or reduce) positive yield bias caused by negative yield clipping and other elemental yield processing methods.

Figure 1:
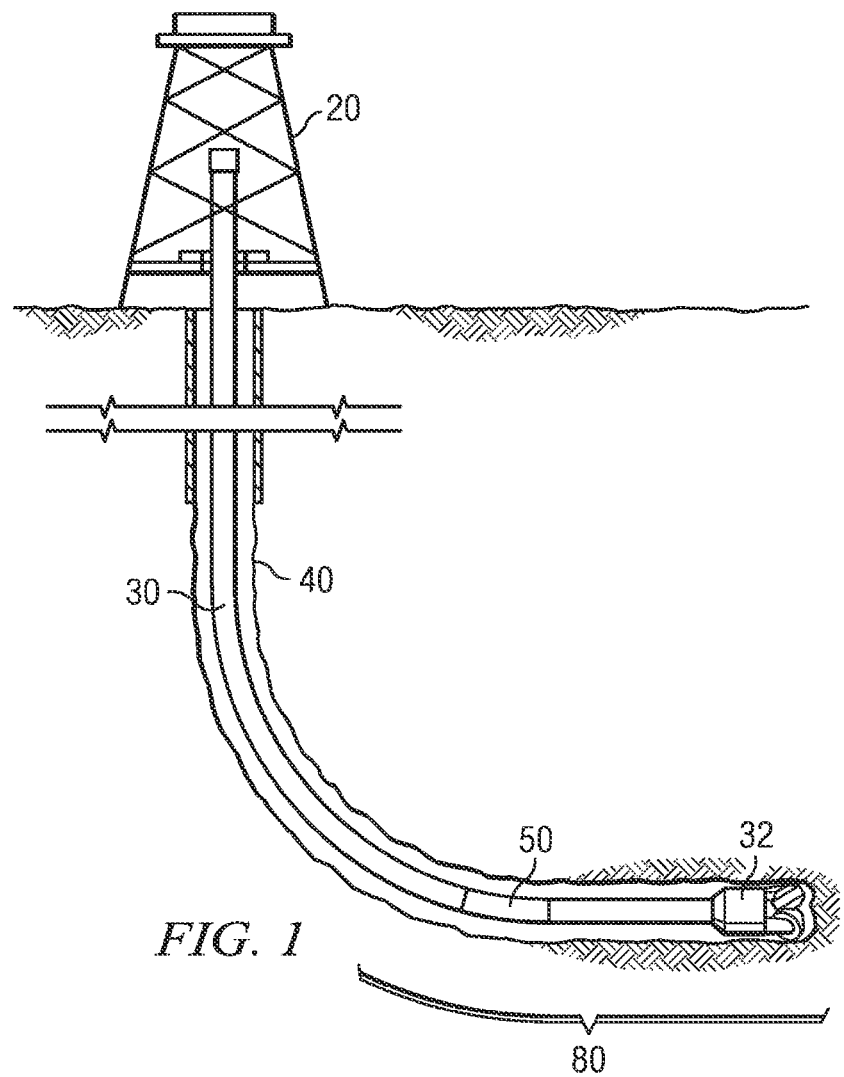
FIG. 1 depicts an example drilling rig including a disclosed gamma ray spectroscopy logging tool.

FIG. 1 depicts an oil or gas drilling rig 20 including an example gamma ray spectroscopy logging tool 50. In the depicted embodiment a land rig 20 is positioned over an oil or gas formation (not shown). The rig may include a derrick and a hoisting apparatus (not shown) for raising and lowering a drill string 30, which, as shown, extends into borehole 40 and includes a drill bit 32 deployed at the lower end of a bottom hole assembly (BHA) 80. The BHA 80 further includes the example gamma ray spectroscopy logging tool 50.

It will be understood that the deployment illustrated on FIG. 1 is merely an example. Drill string 30 may include substantially any suitable downhole tool components, for example, including a steering tool such as a rotary steerable tool, a downhole telemetry system, and one or more additional MWD and/or LWD tools including various sensors for sensing downhole characteristics of the borehole and the surrounding formation. The disclosed embodiments are by no means limited to any particular drill string configuration.

It will be further understood that the disclosed embodiments are not limited to use with a land rig, but are equally well suited for use with either onshore or offshore subterranean operations. Moreover, the disclosed embodiments are not limited to logging while drilling embodiments as illustrated on FIG. 1. The disclosed embodiments are equally well suited for use with any gamma ray spectroscopy logging tool, including wireline logging tools, slickline logging tools, and also the analysis of natural gamma rays acquired from mud samples at the surface.

Figure 2:
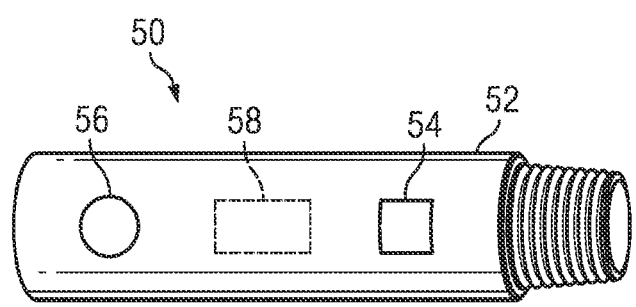
FIG. 2 schematically depicts one example embodiment of the gamma ray spectroscopy logging tool shown on FIG. 1.

FIG. 2 schematically depicts one example embodiment of gamma ray spectroscopy logging tool 50. The tool 50 includes a gamma ray detector 54 deployed in a tool collar 52 (or an internal tool mandrel, not shown). The tool collar 52 and optional internal mandrel may be referred to collectively herein as a tool body. The gamma ray detector 54 may include substantially any suitable gamma ray detector, for example, including a sodium iodide (NaI) scintillator crystal and a photomultiplier. Induced gamma ray logging tool embodiments may further include a neutron source 56 deployed in the tool collar 52 (or an internal mandrel). The neutron source 56 may include substantially any suitable neutron source, for example, including a sealed chemical source or an electrical source. Suitable electrical neutron sources may be substantially continuous or pulsed and commonly make use of the deuterium-tritium (D-T) nuclear reaction, the deuterium-deuterium (D-D) nuclear reaction, and/or the tritium-tritium (T-T) nuclear reaction for example. Pulsed neutron generators (PNGs) are commonly used in the industry.

With continued reference to FIG. 2, logging tool 50 may further include an electronic controller 58 including one or more processors (e.g., microprocessors) and electronic memory. The controller 58 may include processor executable instructions (e.g., stored in memory) configured to receive electrical/electronic signals from the gamma ray detector 54 and to process the signals to generate gamma ray spectra including the number of detected gamma rays (gamma ray counts) in each of a number of distinct energy channels (e.g., up to and exceeding 100 distinct channels). In logging tool embodiments including an electrical neutron source 56, such as a PNG, the controller 58 may also be configured to cause the neutron source 56 to emit neutrons in a predetermined emission sequence (e.g., in pulses having a predetermined pulse lengths and pulse intervals). The controller 58 may further include processor executable instructions configured to execute the disclosed methods steps described in more detail below (e.g., with respect to FIGS. 4, 6, and 7). It will, of course, be understood that the disclosed embodiments are not limited to the use of or the configuration of any particular controller hardware, firmware, and/or software.

Acquired natural gamma ray spectra or induced gamma ray spectra may be decomposed into contributions from individual elements by fitting the sum of standard gamma ray spectra to the measured spectrum, for example, as follows:

$$U_i = \sum_{j=1}^{n} y_j \cdot S_{ij} \quad (1)$$

where $U_i$ represents the value of the measured spectrum at channel i, $S_{ij}$ represents spectral standard j at channel i, and $y_j$ represents the yield (i.e., the contribution of spectral or elemental standard j to the measured spectrum) and n represents the number of standards (or elements) used in the fit. The yields may be computed via a weighted least squares procedure, for example, as disclosed in U.S. Pat. No. 3,521, 064, via an expanded non-linear method as disclosed in U.S. Pat. No. 5,369,578, and/or as follows in Eq. (2):

$$\chi^2(\vec{y}, gn, of, rdf, NL) = \frac{1}{v} \cdot \sum_{i=lc}^{tc} \frac{\sum_{j=1}^{n} (y_j \cdot f(S_{ij}, gn, of, rdf, NL) - U_i)^2}{\text{Var}(U_i)} \quad (2)$$

where $\chi^2$ represents the reduced chi-square, $\vec{y}$ represents the yield vector belonging to the elemental standards $S_{ij}$, lc and tc represent the lowest and highest channels in the fitting range, gn, of, rdf and NL represent energy scale adjustments (such as gain, offset, resolution degradation, and non-linearity) made to the standard spectra to match the measured spectrum.

The above fitting algorithms compute a best fit of the acquired spectrum, for example, via summing spectral contributions from individual elements. Since the acquired spectra are statistical, these spectral contributions have statistical errors. By statistical it is meant that the acquired spectra are not continuous (or smooth) functions, but are discrete and include integer numbers of detected gamma rays in a discrete number of distinct energy channels. When a particular element is absent in the formation, the resulting yield obtained from the above described fitting should theoretically be equal to zero but can be negative owing to statistical errors.

The obtained yields may be converted to elemental concentrations using methods well known in the industry. In such methods, the aforementioned negative yields result in corresponding negative elemental concentrations that are clearly and obviously unphysical. It will be understood that the methods disclosed herein may be applied to and are intended to correct the yields and/or the elemental concentrations derived therefrom. Therefore, in the disclosure that follows, the terms "yield" and "elemental yield" are used interchangeably and refer to the aforementioned yields obtained via fitting gamma ray spectra and/or the elemental concentrations derived from those yields.

Figure 3:
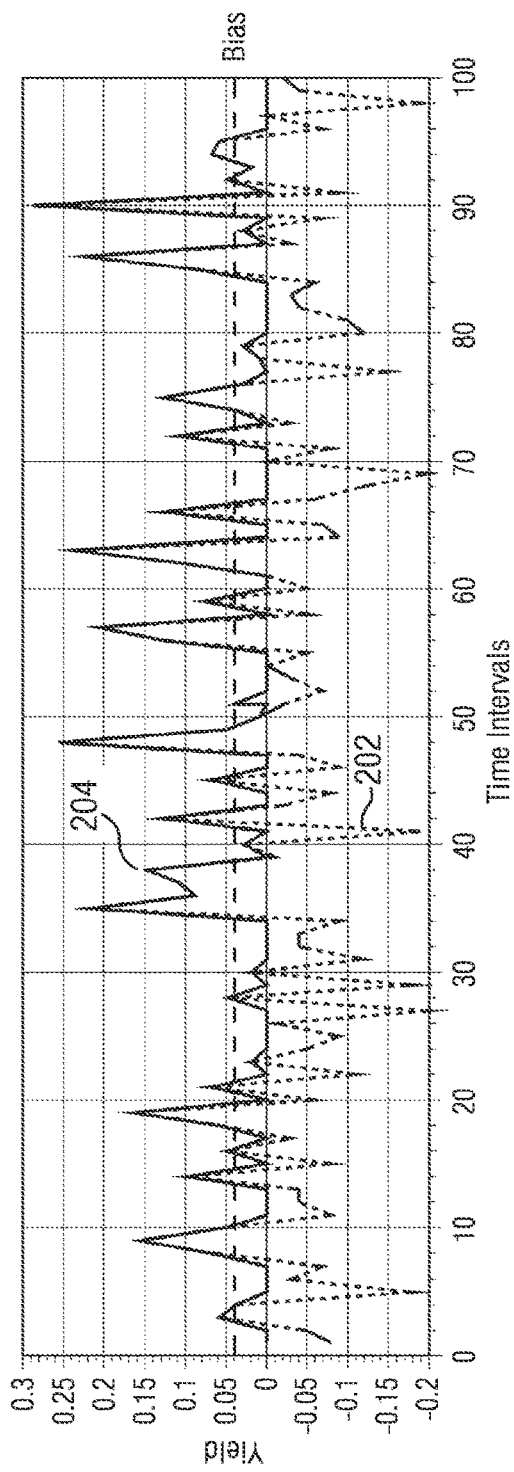
FIG. 3 depicts a plot of a simulated log for a zero-yield element on the vertical axis versus time intervals (or discrete spectrum times) on the horizontal axis.

FIG. 3 depicts a plot of a simulated log for a zero yield element on the vertical axis versus time intervals (or discrete spectrum times) on the horizontal axis. In practical applications, each of the time intervals may range from a fraction of a second per interval (e.g., for wireline logging operations) to tens of seconds per interval (e.g., in a logging while drilling operation). The simulated yields, including the negative yields, are shown as a dotted line at 202. Note the statistical fluctuation (the noisy yield values) about the zero line (zero on the vertical axis). Those of ordinary skill will readily appreciate that a time based log (as shown on FIG. 3) may be readily converted to a depth based log with knowledge of the drilling rate of penetration (in LWD embodiments) or the logging speed (in wireline or slickline embodiments). The disclosed embodiments are, of course, not limited to the use of time based logs.

One common approach used to correct negative yields is to simply set the negative yields to zero (as illustrated by the solid line at 204 in FIG. 3). It will be appreciated that the negative yields may be set to zero after fitting each spectrum, after the conversion to elemental concentrations, or through the use of a constrained fit that only allows zero valued or positively valued yields. As described above in the background section, this approach results in a positive bias on the average yield, since positive excursions (statistical or real) are not affected (or accounted) by the procedure. This is illustrated by the dashed line, non-zero bias at a yield value of about 0.04.

Figure 4:
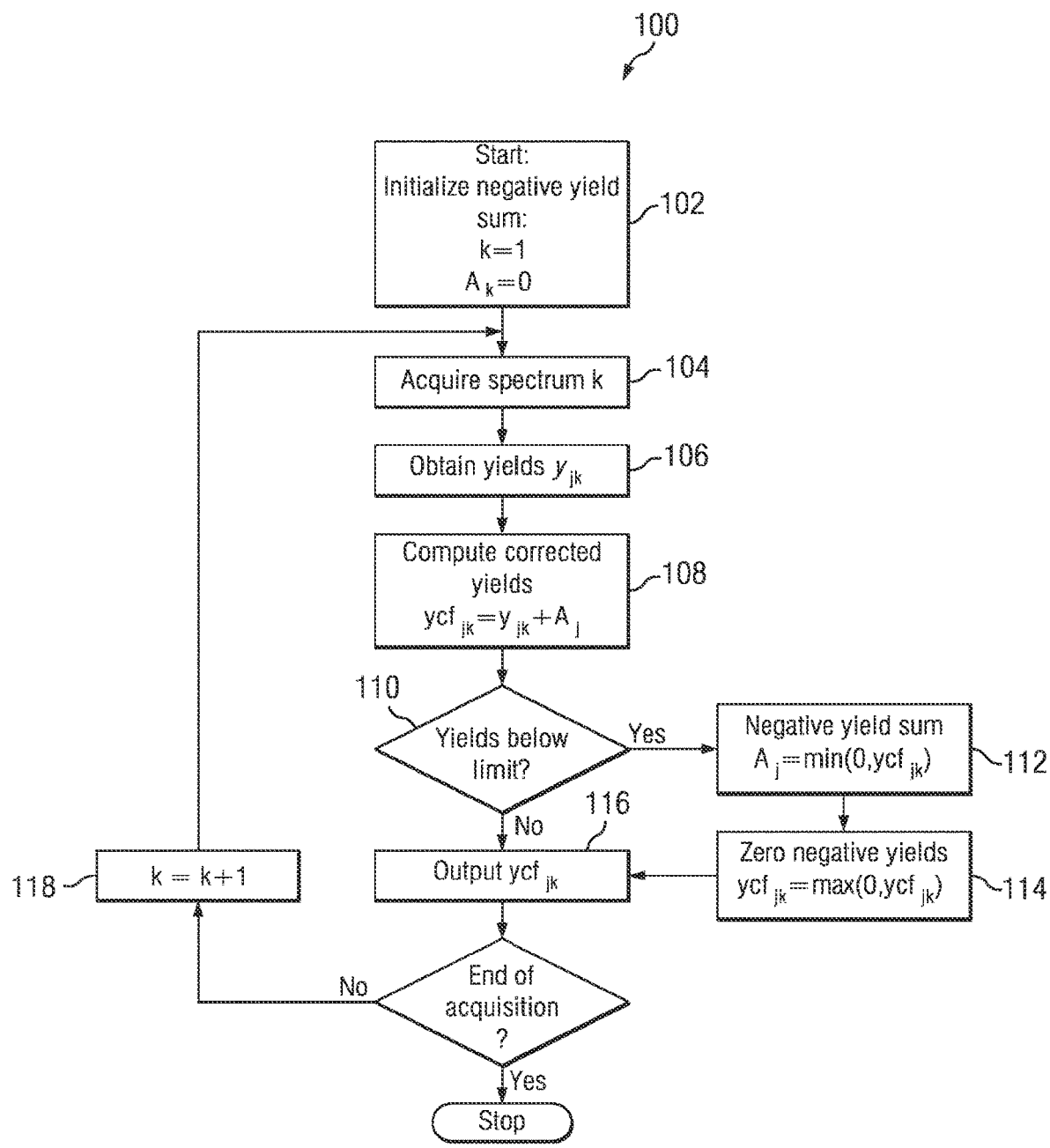
FIG. 4 depicts a flow chart of one example method for obtaining corrected elemental yield values.

FIG. 4 depicts a flow chart of one example method 100 for correcting yield values. The method 100 may be executed in real time while logging (e.g., by a controller or processor located in the logging tool) or after the logging operation (e.g., via post-processing by a surface processor). Such post-processing may be executed at any suitable location, for example, including the rig site or any remote location such as a data processing center or at a customer site. The method may be initialized at 102 by setting a time interval (or spectrum number) k equal to 1 and an accumulated sum of negative yields $A_j$ equal to zero (in which the index j represents an index number of the elemental spectral standards used to fit the acquired gamma ray spectra). A gamma ray spectrum k may be acquired at 104. The spectra may be acquired in real time while logging or acquired as a set of spectra after completion of the logging operation. In real time embodiments, gamma rays may be received (and counted) over a predetermined time interval to obtain the spectra. Moreover, the acquired spectra may be further processed at 104, for example, to subtract background natural gamma rays or a background from gamma rays caused by neutron activation. For inelastic gamma ray spectra, capture gamma rays, activation gamma rays, and natural gamma rays may be subtracted. The disclosed embodiments are not limited in these regards.

A best fit of the acquired spectrum may be computed at 106 to obtain the elemental yields $y_{jk}$, for example, as described above. As noted above these yields may include the yields obtained via fitting the acquired spectrum and/or the corresponding elemental concentrations derived therefrom. A corrected yield $ycf_{jk}$ may be computed at 108 as being the sum of yields $y_{jk}$ (obtained at 106) and the accumulated sum of negative yields $A_j$. Note that the corrected yield is denoted as $ycf_{jk}$ indicating that the yields are corrected in the forward direction with respect to increasing time (e.g., from k=1 . . . m, where m is the number of acquired spectra in the set).

With continued reference to FIG. 4, the corrected yield may be compared with a yield threshold at 110. In example embodiments, the yield threshold may be zero, however the disclosed embodiments are not limited in this regard as non-zero thresholds may also be utilized. For example, situations may arise in which the threshold is slightly above or below zero to account for known biases in the yield processing. In such instances a "negative yield" is understood to be a yield having a value below the predefined threshold. Yields below the threshold (e.g., negative yields) may be accumulated at 112, for example, as follows: $A_j$=min (0, $ycf_{jk}$) where min (•) selects the minimum value. Negative corrected yields may be set equal to zero at 114, for example, as follows: $ycf_{jk}$=max (0, $ycf_{jk}$) where max (•) selects the maximum value. The corrected yield values $ycf_{jk}$ may be output at 116.

Although not depicted in FIG. 4, steps 108, 110, 112, 114, and 116 may be iteratively repeated for each of the standard spectra (or elements) j, for example, for j=1 . . . n. After the yields of each standard spectrum (or element) has been evaluated, the spectrum number k is incremented at 118 and the method 100 repeats steps 104, 106, 108, 110, 112, 114, and 116 for the next gamma ray spectrum k.

With continued reference to FIG. 4, it will be appreciated that yields $y_{jk}$ are corrected using the accumulated sum of negative yields $A_j$ (where the accumulated sum is computed from spectrum to spectrum for a common elemental standard) and that $A_j$ has a maximum value of zero ($A_j \leq 0$). Thus, for example, when the obtained yield is negative ($y_{jk}<0$), then the corrected yield $ycf_{jk}$ is also negative at 110 ($ycf_{jk}=y_{jk}+A_j$) since $A_j \leq 0$. When $A_j$ is negative ($A_j<0$), the corrected yield $ycf_{jk}$ is an accumulation (or sum) of the current negative yield and previous negative yields. The accumulated sum of negative yields $A_j$ is then set equal to the corrected yield at 112 and the corrected yield is set equal to zero at 114. When the obtained yield is positive ($y_{jk}>0$), then the corrected yield $ycf_{jk}$ may be positive, negative, or zero at 110 depending on the value of $A_j$. When the corrected yield $ycf_{jk}$ is negative, the accumulated sum of negative yields $A_j$ is set equal to the corrected yield at 112 and the corrected yield is set equal to zero at 114. When the corrected yield $ycf_{jk}$ is positive or zero, the accumulated sum of negative yields $A_j$ is set equal to zero 112 and the corrected yield is output unchanged.

It will be appreciated that the disclosed embodiments may be applied to yield logs (both yield logs and elemental concentration logs) obtained from natural gamma ray spectra or induced gamma ray spectra. The disclosed embodiments are not limited in this regard. Natural gamma ray spectroscopy measures gamma rays that are emitted as natural radiation by the formation. Induced gamma ray spectroscopy measures gamma rays emitted by a nucleus that has been activated by neutron bombardment. Induced gamma ray spectra may include capture gamma ray spectra, inelastic gamma ray spectra, or neutron activation spectra. It will further be appreciated that net inelastic gamma ray spectra may be obtained, for example, by subtracting capture, activation and natural gamma ray contributions from a spectrum obtained during the neutron burst. Capture gamma ray spectra may be obtained, for example, by subtracting activation and natural gamma ray contributions from a spectrum obtained during one or more capture intervals.

Figure 5:
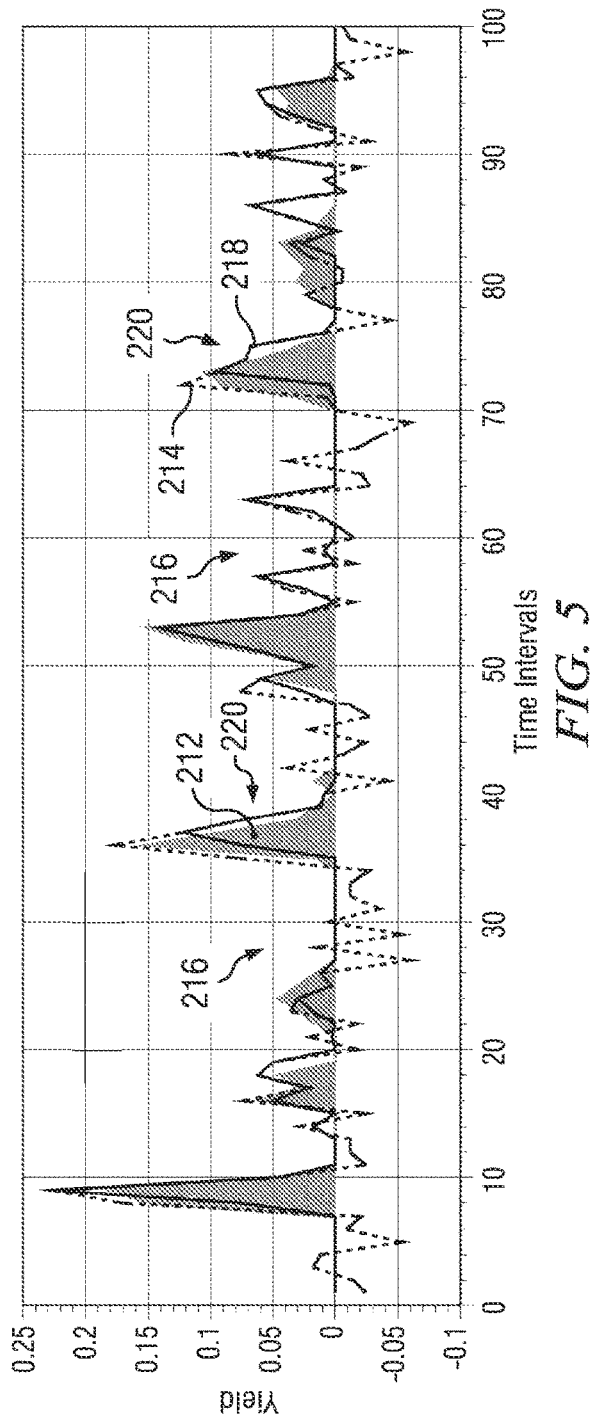
FIG. 5 depicts another plot of a simulated elemental yield log on the vertical axis versus time (or a number of time intervals) on the horizontal axis.

FIG. 5 depicts another plot of an example simulated elemental yield log on the vertical axis versus time (or a number of time intervals) on the horizontal axis. A simulated true yield is shown as a gray shaded region at 212 and a simulated true yield with added noise is shown as a dotted line at 214. The true yield may be thought of as being representative of the actual fraction of a particular element in a formation while the true yield with added noise is representative of the elemental yields computed via fitting a set of gamma ray spectra. Note that the true yield is either positive or zero while the true yield with added noise can be both positive and negative (particularly at time intervals at which the true yield is zero or near zero as indicated at 216). FIG. 5 further depicts a solid line at 218 that indicates the corrected yield determined using method 100 (FIG. 4). Note that corrected yield obtained using method 100 removes the unphysical negative yields and matches the true yield for many (most) of the regions in which the true yield is zero.

It will be appreciated that the corrected yield $ycf_{jk}$ obtained using method 100 (FIG. 4) is time shifted to later time intervals with respect to the true yield since negative yields are corrected by adjusting subsequent yields (yields obtained at a later time interval). This time shifting can be observed, for example, at 220 of FIG. 5. Such a time shift may be acceptable in certain operations, for example, when the true yield is zero or near zero for large time intervals. However, it may be advantageous in other operations to provide a more symmetric (i.e., not time shifted) corrected yield (such as when the formation includes boundaries at which the true yield transitions from zero to a positive value or from a positive value to zero).

Figure 6:
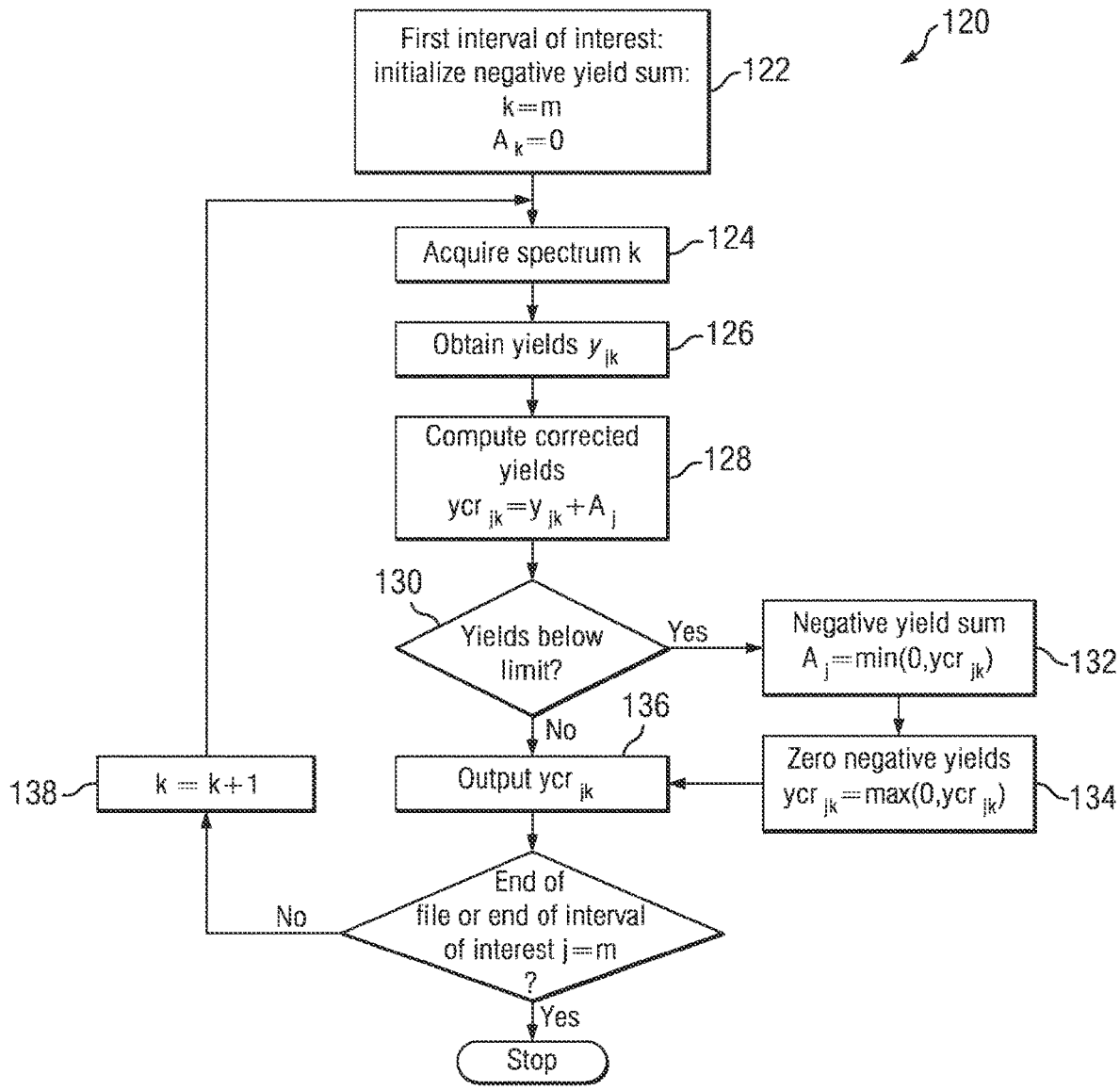
FIG. 6 depicts a flow chart of another example method for obtaining corrected elemental yield values.

Turning now to FIG. 6, a flow chart of another example method 120 for obtaining corrected elemental yields is depicted. The method 120 may be a post processing methodology for processing a set of spectra and may be executed by a controller or processor located in the logging tool or by a surface processor. The method may be initialized at 122 by setting the time interval (or spectrum number) k equal to m for a set of spectra in which k=1 ... m and $A_j$ equal to zero. Gamma ray spectrum k is acquired at 124 and fit at 126 to obtain the yields $y_{jk}$, for example, as described above. As also noted above these yields may include the yields obtained via fitting the acquired spectrum and/or the corresponding elemental concentrations derived therefrom. A corrected yield $ycr_{jk}$ may be computed at 128 as being the sum of yields $y_{jk}$ (obtained at 126) and the accumulated sum of negative yields $A_j$. Note that the corrected yield is denoted as $ycr_{jk}$ indicating that the yields are corrected in the reverse direction (e.g., from k=m ... 1, where m is the number of acquired spectra).

With continued reference to FIG. 6, method 120 is similar to method 100 in that the corrected yield may be compared with a yield threshold at 130. Yields below the threshold (e.g., negative yields) may be accumulated at 132, for example, as follows: $A_j$=min (0, $ycr_{jk}$). Negative corrected yields may be set equal to zero at 134, for example, as follows: $ycr_{jk}$=max (0, $ycr_{jk}$). The corrected yield values $ycr_{jk}$ may be output at 136. Although not depicted in FIG. 6, steps 128, 130, 132, 134, and 136 may be iteratively repeated for each of the standard spectra (or elements) j, for example, for j=1 ... n. After the yields of each standard spectrum (or element) have been evaluated, the spectrum number k is incremented downward at 138 and the method 120 repeats steps 124, 126, 128, 130, 132, 134, and 136 for the preceding gamma ray spectrum k.

It will be appreciated that for real time applications (e.g., data evaluation while logging), the use of a reverse evaluation from the end of the log back to the beginning of the log is not possible. However, method 120 may be executed using a buffer of N intervals to compute back to interval j-N. A buffer including substantially any suitable number of intervals N may be used, provided that there is sufficient memory in the downhole controller. The number of intervals N may be, for example, 30, 50, 70, 100, or more. Moreover, an adjustable buffer length may be selected, for example, to ensure that the negative sum $A_{j-N}$ is zero.

While not depicted on FIGS. 4 and 6, the yield data (the yield versus time interval data) may optionally be filtered to reduce noise prior to correcting the yields. Substantially any filter may be used, for example, including boxcar, triangular, and polynomial filters. In such embodiments, care may need to be exercised to ensure that the filtering does not cause a bias to the data or overly reduce the temporal resolution of the data.

Figure 7:
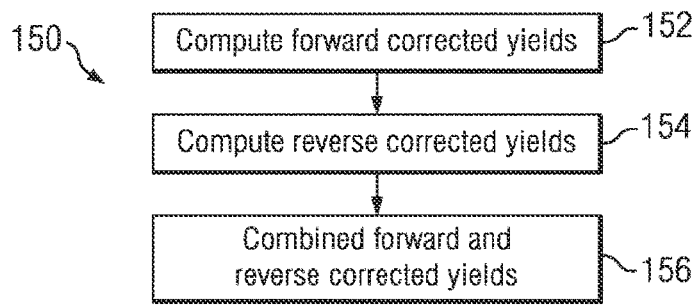
FIG. 7 depicts a flow chart of still another example method for obtaining corrected elemental yield values.

FIG. 7 depicts a flow chart of another example method 150 for obtaining corrected yields. Forward corrected yields are computed at 152, for example, via method 100 (FIG. 4). Reverse corrected yields are computed at 154, for example, via method 120 (FIG. 6). For example, the forward corrected yields may be computed at 152 in real time while drilling (logging), while the reverse corrected yields may be computed after a predetermined number of spectra have been obtained or at the completion of a logging operation. The forward corrected yields and the reverse corrected yields may be combined at 156 to compute an average corrected yield. The average corrected yield may be, for example, an average (mean) or weighted average of the forward and reverse corrected yields. In another example embodiment, the average corrected yield may be computed, for example, as follows:

$$cya_{jk} = \begin{cases} 0; & \text{when } cyf_{jk} = 0 \text{ or } cyr_{jk} = 0 \\ l \cdot cyf_{jk} + (1-l) \cdot cyr_{jk}; & \text{when } cyf_{jk} > 0 \text{ and } cyr_{jk} > 0 \end{cases} \quad (3)$$

where $cya_{jk}$ represents the combined corrected yield and $0<l<1$. Note that in Eq. (3) $cya_{jk}$ is set equal to zero when either or both of the forward corrected yield or the reverse corrected yield is equal to zero. Otherwise (when both the forward corrected yield and the reverse corrected yield are positive), the combined corrected yield is an average (when l=0.5) or a weighted average of $cyf_{jk}$ and $cyr_{jk}$.

Figure 8:
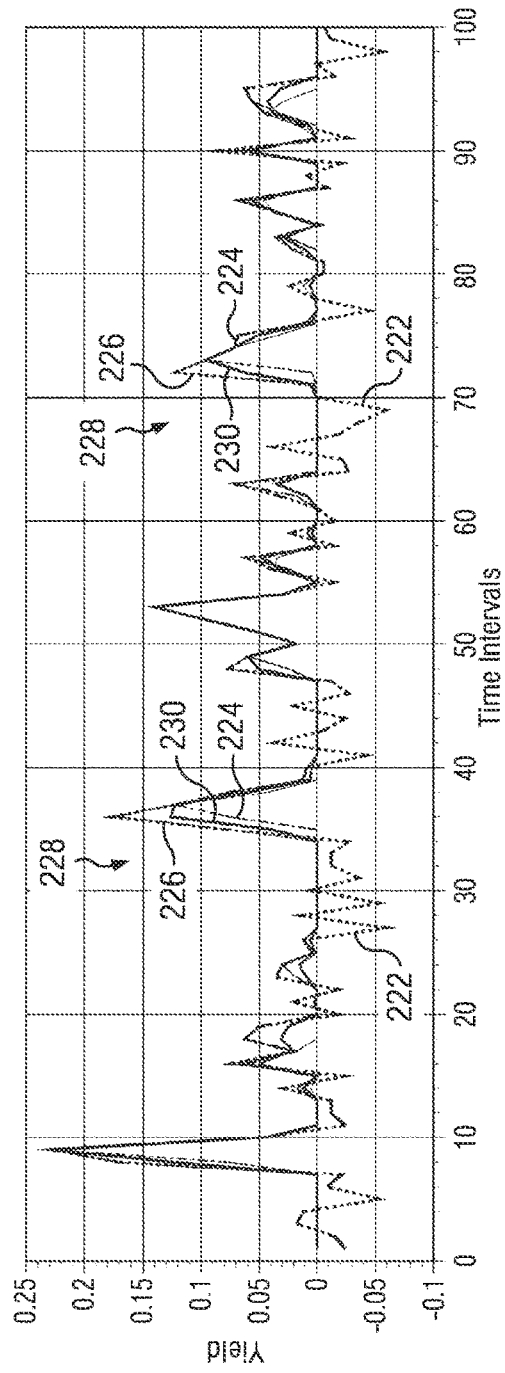
FIG. 8 depicts still another plot of a simulated elemental yield log on the vertical axis versus time (or a number of time intervals) on the horizontal axis.

FIG. 8 depicts a still another plot of a simulated elemental yield log on the vertical axis versus time (or a number of time intervals) on the horizontal axis. The simulated true yield with added noise from FIG. 5 is shown at 222. The forward corrected yield $ycf_{jk}$ computed using method 100 and shown on FIG. 5 is shown at 224. The reverse corrected yield $ycr_{jk}$ computed using method 120 is shown at 226. Note that the reverse corrected yield $ycr_{jk}$ computed using method 120 also removes the unphysical negative yields and matches the true yield for many (most) of the regions in which the true yield (FIG. 5) is zero. Note also that the reverse corrected yield $ycr_{jk}$ is time shifted in the negative time direction (the opposite direction as the forward corrected yield), for example, as can be seen at 228. FIG. 8 further depicts an average corrected yield at 230. Note that in this example, the average corrected yield is advantageously in sync with the true yield (i.e., not time shifted).

Figure 9:
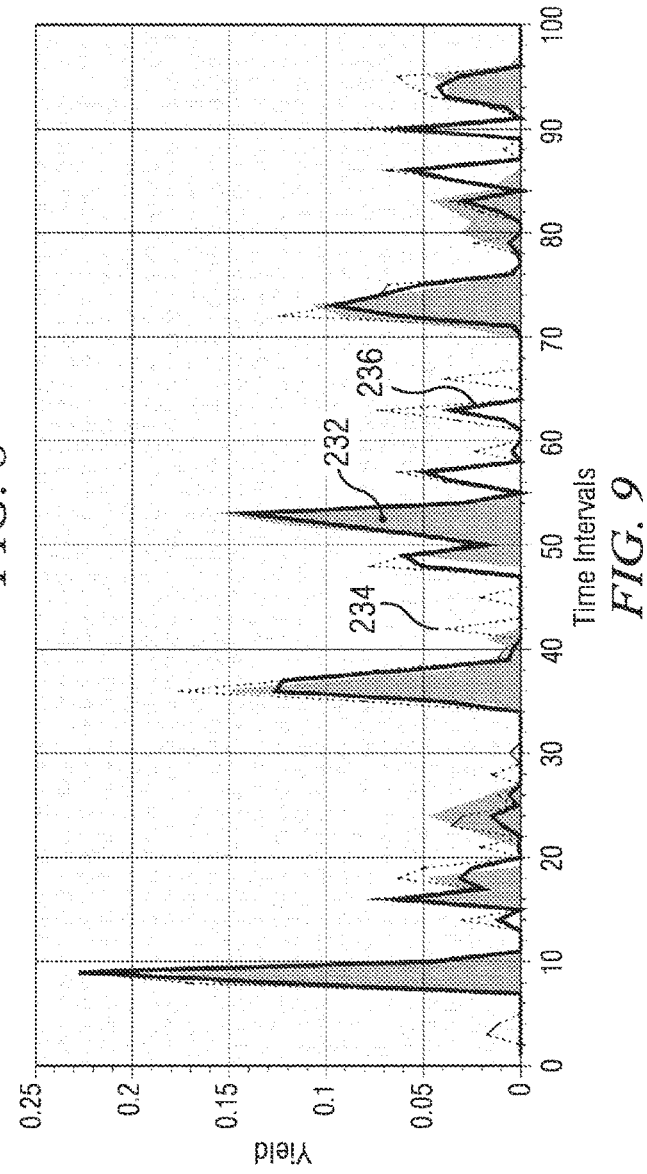
FIG. 9 depicts yet another plot of a simulated elemental yield log on the vertical axis versus time (or a number of time intervals) on the horizontal axis.

FIG. 9 depicts yet another plot of a simulated elemental yield log on the vertical axis versus time (or a number of time intervals) on the horizontal axis. The simulated true yield with added noise from FIG. 5 is shown as a shaded region at 232. A clipped noisy yield is shown at 234. And an average corrected yield is shown at 236 (the average of the forward corrected yield obtained method 100 and the reverse corrected yield computed using method 120 as shown on FIG. 8). Note that the average corrected yields advantageously identify many (most) of the zero yield regions as compared to the clipped noisy yield and are further advantageously in sync with the true yield.

It will be appreciated that the averaging scheme employed to compute the average corrected yield may depend on the overall objectives of the logging operation. For example, the average corrected yield obtained using Eq. (3) may sometimes improve the identification of zero yield time intervals in the yield log, however, it may also introduce a small negative yield bias to an overall average yield computed over the entire log (or over a plurality of time intervals). Moreover, there may be operations in which the use of a weighted average is advantageously employed (e.g., in which either the forward corrected yield or the reverse corrected yield is weighted heavier than the other). The disclosed embodiments are not limited in these regards.

With continued reference to the yield plots shown on FIGS. 5, 8, and 9, it is apparent that effectiveness of the negative yield suppression may (at times) depend on the starting point of the processing (since the negative yields are accumulated). Negative yield suppression may then be potentially improved, for example, by computing corrected yields (forward and/or reverse) at multiple starting and ending points in the log. For example, the log may be divided into multiple overlapping intervals for processing (e.g., spectra 1-100, 5-105, 10-110, 15-115, and so forth). The multiple corrected yields computed for any particular spectrum may then be averaged to obtain a combined corrected yield.

It will be appreciated that in certain example embodiments it may be advantageous to limit the maximum value of a particular elemental yield based on the value of another elemental yield, based on a priori knowledge of the formation, and/or based on a physical limitation. For example only, the maximum magnesium yield associated with the presence of dolomite ($CaMg(CO_2)_2$) may be restricted as a function of the measured yield for calcium and possibly the yields of other elements present in calcium compounds such as anhydrite ($CaSO_4$). In such instances, where a particular elemental yield is limited to a maximum value, these maximum yields may restrict the maximum corrected yields at 114 and 134 of methods 100 and 120. It will be appreciated that the maximum allowable yield may change from one spectral acquisition to the next and the limit may vary from one logging operation to the next. This may be accounted, for example, by using a variable limit and computing the corrected yields accordingly.

With reference again to FIGS. 4, 6, and 7, methods 100, 120, and 150 may further include redistributing the non-zero yields for time intervals at which one or more of the corrected yields were set equal to zero. For example, values of the non-zero yields may be adjusted such that they sum to 1 (100%). In another example, another best fit of the spectrum may be computed without the standard spectrum/ spectra that were set to zero (e.g., only using standard elemental spectra that had positive yields). Furthermore, while not depicted, methods 100, 120, and 150 may further include computing an average corrected yield over a plurality of time intervals (or over an entire log or over a predetermined depth interval).

While the disclosed embodiments relate to spectral acquisitions in time it will be appreciated that well logging has traditionally been done as a function of depth (rather than time). In certain example embodiments, the above described yield logs (or corrected yield logs) may be converted from time based logs to a depth based log using methods known to those of ordinary skill. In other example embodiments, the disclosed methods may be applied to a depth based log. In such depth based logs, the time spent acquiring the data in a depth interval may not be constant. This can influence the statistical uncertainty, which typically increases in inverse proportion to the square root of the acquisition time. In embodiments in which there are significant variations in the logging speed (e.g., in the rate of penetration of drilling in an LWD operation), the statistical excursions may change and may therefore be under or overcorrected if the disclosed algorithm is used on depth data. This may be accounted by weighting each spectrum and the associated yields based on the measurement time of the interval.

It will be appreciated that the disclosed embodiments are not strictly limited to gamma ray spectroscopy measurements but can be applied to other data where unphysical results may be observed owing to statistical uncertainty. For example, in other logging applications, in particular nuclear well logging, there may be instances where a result may exceed a maximum value or be below a minimum value due to statistical variations or noise.

In another example, filtering, acquisition or processing of statistical data can lead to unphysical results (or results above or below a threshold). The disclosed embodiments may be applied, for example, in image processing applications, which sometimes rely on statistical data. For example, in certain applications an image may have a low level of dark counts. A noise threshold may be set to improve the contrast of the image. In such applications, the disclosed embodiments may be applied in two dimensions (to the image). For example, in a raster image, one approach processes along each perpendicular axis, processing in the forward and reverse directions on each. An average (or weighted average) may then be computed to reduce background noise. The disclosed embodiments may also be applied to images including curved surfaces where data points above or below the surface may not be physical to reduce the noise due to unphysical statistical results.

It will be understood that the present disclosure includes numerous embodiments. These embodiments include, but are not limited to, the following embodiments.

In a first embodiment, a method for correcting elemental yields obtained from gamma ray spectra comprises acquiring a plurality of elemental yields corresponding to a plurality of time intervals; summing one of the plurality of elemental yields with an accumulated negative yield to compute a corrected yield; setting the accumulated negative yield to a minimum of zero and the computed corrected yield; resetting the corrected yield to a maximum of zero and the computed corrected yield; and repeating the summing, the setting, and the resetting, for each of the acquired plurality of elemental yields to compute a corresponding plurality of corrected elemental yields.

A second embodiment may include the first embodiment wherein each of the plurality of elemental yields comprises a plurality of sets of elemental yields; and each of the sets of elemental yields is derived from a corresponding gamma ray spectrum.

A third embodiment may include the second embodiment, wherein the repeating comprises repeating the summing, the setting, and the resetting for each of the acquired plurality of elemental yields in each of the sets of elemental yields.

A fourth embodiment may include any one of the first through the third embodiments, wherein the acquiring the plurality sets of elemental yields comprises acquiring a plurality of gamma ray spectra corresponding to the plurality of time intervals; and fitting each of the plurality of gamma ray spectra with a set of elemental spectra to obtain a corresponding set of yields.

A fifth embodiment may include the fourth embodiment, wherein the acquiring the plurality sets of elemental yields further comprises converting the set of yields to a corresponding set of elemental concentrations.

A sixth embodiment may include any one of the fourth through the fifth embodiments, further comprising: identifying members of the set of elemental spectra for which the reset corrected yield is zero; removing the identified members from the set of elemental spectra to obtain a second set of elemental spectra; and refitting each of the plurality of gamma ray spectra with the second set of elemental spectra to obtain a corresponding second set of yields.

A seventh embodiment may include any one of the first through the sixth embodiments, wherein the repeating comprises repeating the summing, the setting, and the resetting in a forward direction with respect to increasing time to compute a corresponding plurality of forward corrected elemental yields.

An eighth embodiment may include any one of the first through the seventh embodiments, wherein the repeating comprises repeating the summing, the setting, and the resetting in a reverse direction with respect to increasing time to compute a corresponding plurality of reverse corrected elemental yields.

A ninth embodiment may include any one of the first through the eighth embodiments, wherein the repeating comprises: repeating the summing, the setting, and the resetting in a forward direction with respect to increasing time to compute a corresponding plurality of forward corrected elemental yields; repeating the summing, the setting, and the resetting in a reverse direction with respect to increasing time to compute a corresponding plurality of reverse corrected elemental yields; and the method further comprises averaging the plurality of forward corrected elemental yields and the plurality of reverse corrected elemental yields to compute a corresponding plurality of average corrected yields.

A tenth embodiment may include any one of the first through the ninth embodiments, further comprising computing an average of a subset of the plurality of corrected elemental yields to compute an average corrected elemental yield.

In an eleventh embodiment, a logging tool comprises: a gamma ray detector deployed in a logging tool body; an electronic controller deployed in the logging tool body, the electronic controller including a processor including instructions configured to: acquire a plurality of elemental yields corresponding to a plurality of time intervals; sum one of the plurality of elemental yields with an accumulated negative yield to compute a corrected yield; set the accumulated negative yield to a minimum of zero and the computed corrected yield; reset the corrected yield to a maximum of zero and the computed corrected yield; and repeat the summing, the setting, and the resetting for each of the acquired plurality of elemental yields to compute a corresponding plurality of corrected elemental yields.

A twelfth embodiment may include the eleventh embodiment, wherein the processor includes further instructions to: cause the gamma ray detector to acquire a plurality of gamma ray spectra corresponding to the plurality of time intervals; and fit each of the plurality of gamma ray spectra with a set of elemental spectra to obtain a corresponding set of yields.

A thirteenth embodiment may include the twelfth embodiment, wherein the processor includes further instructions to: identify members of the set of elemental spectra for which the reset corrected yield is zero; remove the identified members from the set of elemental spectra to obtain a second set of elemental spectra; and refit each of the plurality of gamma ray spectra with the second set of elemental spectra to obtain a corresponding second set of yields.

A fourteenth embodiment may include any one of the twelfth through thirteenth embodiments, wherein the instructions are configured to execute the causing, the fitting, the summing, the setting, and the resetting in real time while logging the wellbore.

A fifteenth embodiment may include any one of the eleventh through fourteenth embodiments, wherein the instructions are further configured to: repeat the summing, the setting, and the resetting in a forward direction with respect to increasing time to compute a corresponding plurality of forward corrected elemental yields; repeat the summing, the setting, and the resetting in a reverse direction with respect to increasing time to compute a corresponding plurality of reverse corrected elemental yields; and average the plurality of forward corrected elemental yields and the plurality of reverse corrected elemental yields to compute a corresponding plurality of average corrected yields.

In a sixteenth embodiment a method for correcting elemental yields obtained from gamma ray spectra comprises: acquiring a plurality of elemental yields corresponding to a plurality of time intervals; summing one of the plurality of elemental yields with an accumulated negative yield to compute a corrected yield; setting the accumulated negative yield to a minimum of zero and the computed corrected yield; resetting the corrected yield to a maximum of zero and the computed corrected yield; repeating the summing, the setting, and the resetting for each of the acquired plurality of elemental yields in a forward direction with respect to increasing time to compute a corresponding plurality of forward corrected elemental yields; repeating the summing, the setting, and the resetting for each of the acquired plurality of elemental yields in a reverse direction with respect to increasing time to compute a corresponding plurality of reverse corrected elemental yields; and averaging the plurality of forward corrected elemental yields and the plurality of reverse corrected elemental yields to compute a corresponding plurality of average corrected elemental yields.

A seventeenth embodiment may include the sixteenth embodiment, wherein the acquiring the plurality sets of elemental yields comprises acquiring a plurality of gamma ray spectra corresponding to the plurality of time intervals and fitting each of the gamma ray spectra with a set of elemental spectra to obtain a corresponding set of yields, and the method further comprises: identifying members of the set of elemental spectra for which the average corrected yield is zero; removing the identified members from the set of elemental spectra to obtain a second set of elemental spectra; and refitting each of the plurality of gamma ray spectra with the second set of elemental spectra to obtain a corresponding second set of yields.

An eighteenth embodiment may include any one of the sixteenth through the seventeenth embodiments, wherein the averaging comprises: setting the average corrected elemental yield equal to zero when one or both of the forward corrected elemental yield and the reverse corrected elemental yield is equal to zero; and setting the average corrected elemental yield equal to an average of the forward corrected elemental yield and the reverse corrected elemental yield when both the forward corrected elemental yield and the reverse corrected elemental yield are non-zero.

A nineteenth embodiment may include any one of the sixteenth through the eighteenth embodiments, wherein the method is a post-processing method for processing logging data after completion of a logging operation.

A twentieth embodiment may include any one of the sixteenth through the nineteenth embodiments, further comprising: selecting a buffer including a subset of the plurality of time intervals; and the repeating the summing, the setting, and the resetting for each of the acquired plurality of elemental yields in the forward direction and the repeating the summing, the setting, and the resetting for each of the acquired plurality of elemental yields in the reverse direction are executed on each of the subset of the plurality of time intervals in real time while logging the wellbore.

Although out of range gamma ray elemental yield suppression has been described in detail, it should be understood that various changes, substitutions and alternations can be made herein without departing from the spirit and scope of the disclosure as defined by the appended claims.

What is claimed is:

1. A method for correcting elemental yields obtained from gamma ray spectra, the method comprising:
    acquiring a plurality of elemental yields obtained at a plurality of time intervals using a gamma ray spectroscopy downhole tool;
    summing a first elemental yield of the plurality of elemental yields, the first elemental yield obtained at a first time interval of the plurality of time intervals, with an accumulated negative yield to compute a corrected yield, wherein the accumulated negative yield is set based on a second elemental yield obtained at a second time interval of the plurality of time intervals;
    resetting the accumulated negative yield to a minimum of zero and the computed corrected yield;

resetting the corrected yield to a maximum of zero and the computed corrected yield; and repeating the summing, the resetting of the accumulated negative yield, and the resetting of the corrected yield, for a third elemental yield of the acquired plurality of elemental yields to compute a corresponding plurality of corrected elemental yields.

2. The method of claim 1, wherein:
each of the plurality of elemental yields comprises a plurality of sets of elemental yields; and
each of the sets of elemental yields is derived from a corresponding gamma ray spectrum.

3. The method of claim 1, wherein the acquiring the plurality of sets of elemental yields comprises:
acquiring a plurality of gamma ray spectra corresponding to the plurality of time intervals; and
fitting each of the plurality of gamma ray spectra with a set of elemental spectra to obtain a corresponding set of yields.

4. The method of claim 3, wherein the acquiring the plurality sets of elemental yields further comprises converting the set of yields to a corresponding set of elemental concentrations.

5. The method of claim 3, further comprising:
identifying members of the set of elemental spectra for which the reset corrected yield is zero;
removing the identified members from the set of elemental spectra to obtain a second set of elemental spectra; and
refitting each of the plurality of gamma ray spectra with the second set of elemental spectra to obtain a corresponding second set of yields.

6. The method of claim 1, wherein the repeating comprises repeating the summing, the resetting of the accumulated negative yield, and the resetting of the corrected yield in a forward direction with respect to increasing time to compute a corresponding plurality of forward corrected elemental yields.

7. The method of claim 1, wherein the repeating comprises repeating the summing, the resetting of the accumulated negative yield, and the resetting of the corrected yield in a reverse direction with respect to increasing time to compute a corresponding plurality of reverse corrected elemental yields.

8. The method of claim 1, wherein the repeating comprises:
repeating the summing, the resetting of the accumulated negative yield, and the resetting of the corrected yield in a forward direction with respect to increasing time to compute a corresponding plurality of forward corrected elemental yields;
repeating the summing, the resetting of the accumulated negative yield, and the resetting of the corrected yield in a reverse direction with respect to increasing time to compute a corresponding plurality of reverse corrected elemental yields; and
the method further comprises averaging the plurality of forward corrected elemental yields and the plurality of reverse corrected elemental yields to compute a corresponding plurality of average corrected yields.

9. The method of claim 1, further comprising computing an average of a subset of the plurality of corrected elemental yields to compute an average corrected elemental yield.

10. The method of claim 1, wherein the second time interval occurs before the first time interval, and the third time interval occurs after the first time interval.

11. The method of claim 1, wherein the gamma ray spectroscopy downhole tool is a component of a logging while drilling tool, and wherein the plurality of elemental yields is acquired while the logging while drilling tool is drilling.

12. A logging tool configured for logging a wellbore, the logging tool comprising:
a gamma ray detector deployed in a logging tool body;
an electronic controller deployed in the logging tool body, the electronic controller including a processor including instructions configured to:
acquire a plurality of elemental yields obtained at a plurality of time intervals using the gamma ray detector deployed in the logging tool body;
sum a first elemental yield of the plurality of elemental yields, the first elemental yield obtained at a first time interval of the plurality of time intervals, with an accumulated negative yield to compute a corrected yield, wherein the accumulated negative yield is set based on a second elemental yield obtained at a second time interval of the plurality of time intervals;
reset the accumulated negative yield to a minimum of zero and the computed corrected yield;
reset the corrected yield to a maximum of zero and the computed corrected yield; and
repeat the summing, the resetting of the accumulated negative yield, and the resetting of the corrected yield for a third elemental yield of the acquired plurality of elemental yields to compute a corresponding plurality of corrected elemental yields.

13. The logging tool of claim 12, wherein the processor includes further instructions to:
cause the gamma ray detector to acquire a plurality of gamma ray spectra corresponding to the plurality of time intervals; and
fit each of the plurality of gamma ray spectra with a set of elemental spectra to obtain a corresponding set of yields.

14. The logging tool of claim 13, wherein the processor includes further instructions to:
identify members of the set of elemental spectra for which the reset corrected yield is zero;
remove the identified members from the set of elemental spectra to obtain a second set of elemental spectra; and
refit each of the plurality of gamma ray spectra with the second set of elemental spectra to obtain a corresponding second set of yields.

15. The logging tool of claim 13, wherein the instructions are configured to execute the causing, the fitting, the summing, the resetting of the accumulated negative yield, and the resetting of the corrected yield in real time while logging the wellbore.

16. The logging tool of claim 12, wherein the instructions are further configured to:
repeat the summing, the resetting of the accumulated negative yield, and the resetting of the corrected yield in a forward direction with respect to increasing time to compute a corresponding plurality of forward corrected elemental yields;
repeat the summing, the resetting of the accumulated negative yield, and the resetting of the corrected yield in a reverse direction with respect to increasing time to compute a corresponding plurality of reverse corrected elemental yields; and average the plurality of forward corrected elemental yields and the plurality of reverse corrected elemental yields to compute a corresponding plurality of average corrected yields.

17. A method for correcting elemental yields obtained from gamma ray spectra, the method comprising:
    acquiring a plurality of elemental yields obtained at a plurality of time intervals using a gamma ray spectroscopy downhole tool;
    summing a first elemental yield of the plurality of elemental yields, the first elemental yield obtained at a first time interval of the plurality of time intervals, with an accumulated negative yield to compute a corrected yield, wherein the accumulated negative yield is set based on a second elemental yield obtained at a second time interval of the plurality of time intervals;
    resetting the accumulated negative yield to a minimum of zero and the computed corrected yield;
    resetting the corrected yield to a maximum of zero and the computed corrected yield;
    repeating the summing, the resetting of the accumulated negative yield, and the resetting of the corrected yield for a third elemental yield of the acquired plurality of elemental yields in a forward direction with respect to increasing time to compute a corresponding plurality of forward corrected elemental yields;
    repeating the summing, the resetting of the accumulated negative yield, and the resetting of the corrected yield for the first elemental yield, the second elemental yield, and the third elemental yield of the acquired plurality of elemental yields in a reverse direction with respect to increasing time to compute a corresponding plurality of reverse corrected elemental yields; and
    averaging the plurality of forward corrected elemental yields and the plurality of reverse corrected elemental yields to compute a corresponding plurality of average corrected elemental yields.

18. The method of claim 17, wherein the acquiring the plurality sets of elemental yields comprises acquiring a plurality of gamma ray spectra corresponding to the plurality of time intervals and fitting each of the gamma ray spectra with a set of elemental spectra to obtain a corresponding set of yields, and the method further comprises:
    identifying members of the set of elemental spectra for which the average corrected yield is zero;
    removing the identified members from the set of elemental spectra to obtain a second set of elemental spectra; and
    refitting each of the plurality of gamma ray spectra with the second set of elemental spectra to obtain a corresponding second set of yields.

19. The method of claim 17, wherein the averaging comprises:
    setting the average corrected elemental yield equal to zero when one or both of the forward corrected elemental yield and the reverse corrected elemental yield is equal to zero; and
    setting the average corrected elemental yield equal to an average of the forward corrected elemental yield and the reverse corrected elemental yield when both the forward corrected elemental yield and the reverse corrected elemental yield are non-zero.

20. The method of claim 17, further comprising:
    selecting a buffer including a subset of the plurality of time intervals; and
    the repeating the summing, the resetting of the accumulated negative yield, and the resetting of the corrected yield for each the third elemental yield of the acquired plurality of elemental yields in the forward direction and the repeating the summing, the resetting of the accumulated negative yield, and the resetting of the corrected yield for the first elemental yield, the second elemental yield, and the third elemental yield of the acquired plurality of elemental yields in the reverse direction are executed on each of the subset of the plurality of time intervals in real time while logging a wellbore with the gamma ray spectroscopy downhole tool.

* * * * *